United States Patent [19]

Bodin et al.

[11] Patent Number: 4,607,828
[45] Date of Patent: Aug. 26, 1986

[54] HYDRAULIC ANTIVIBRATION SUPPORT

[75] Inventors: Francois Bodin; Pierre Jouadé; Daniel Le Guillant, all of Chateaudun, France

[73] Assignee: Hutchinson, Paris, France

[21] Appl. No.: 731,010

[22] Filed: May 6, 1985

[30] Foreign Application Priority Data

May 4, 1984 [FR] France .............. 84 06986

[51] Int. Cl.[4] .............................. F16F 9/10
[52] U.S. Cl. .................. 267/140.1; 267/8 R
[58] Field of Search ............ 267/140.1, 153, 152, 267/35, 63 R, 141, 63 A, 8 R, 33; 180/312; 248/562, 636

[56] References Cited

U.S. PATENT DOCUMENTS

| 2,380,899 | 7/1945 | Strachovsky | 267/140.1 |
| 2,519,702 | 8/1950 | Robinson | 267/140.1 |
| 4,159,091 | 6/1979 | LeSalver et al. | 267/140.1 |
| 4,511,126 | 4/1985 | Bernuchon et al. | 267/140.1 |

Primary Examiner—Bruce H. Stoner, Jr.
Assistant Examiner—Alvin Oberley
Attorney, Agent, or Firm—Larson and Taylor

[57] ABSTRACT

The invention relates to an antivibration support to be inserted between the frame and the engine of a vehicle. The support comprises two deformable chambers filled with liquid, separated by a deformable partition, and communicating with one another through a restricted passage, namely an operating chamber whose lateral wall forms a support and joins two rigid parts fixed respectively to the frame and to the engine, and a compensating chamber. When abnormally high thrusts are applied to the engine, the deformations of the wall are limited by abutment, against a ring immersed in the operating chamber and borne by the first rigid part, of a central foot fast to the second rigid part, and passing with clearance through the ring and/or of an overlapping sole terminating this foot.

6 Claims, 2 Drawing Figures

HYDRAULIC ANTIVIBRATION SUPPORT

BACKGROUND OF THE INVENTION

The invention relates to antivibration devices intended to be interposed for support and shock-absorbing purposes between two rigid elements, the shock-absorbing bringing into play the driving of a liquid through a restricted passage, and the movements relating to damping the two rigid elements comprising on the one hand, oscillations of relatively large amplitude (that is to say, greater than a millimeter) at a relatively low frequency (that is to say, less than 20 Hz) and on the other hand, vibrations of relatively small amplitude (that is to say, less than 0.5 mm) at a relatively high frequency (that is to say higher than 20 Hz).

As a non-limiting example, it is indicated that such supports can be mounted between a vehicle frame and the engine of this vehicle, the relatively ample oscillations to be damped, being those created by the irregularities and variations in dip of the ground during the travel of the vehicle over this ground, and the vibrations to be damped, being those due to the operation of the engine.

The invention relates more particularly, among supports of the type concerned, to those which are constituted by a fluid-tight box, interposed between the two rigid elements, the said box comprising two rigid parts which can be made fast respectively with the two rigid elements, a first elastic wall connecting in fluid-tight manner one of the two rigid parts to a rigid annular armature forming a portion of the second part, this first wall bounding with the first part one of the two axial ends of the box and ensuring the role of support between the two parts, for which it offers good resistance to axial compression, a second elastic wall, borne in fluid-tight manner by the annular armature and bounding the second axial end of the box, a deformable partition also borne in fluid tight manner by the annular armature, between the two elastic walls, and dividing the inside of the box into two chambers, namely an operating chamber comprised between the partition and the first elastic wall, and a compensating chamber comprised between the partition and the second elastic wall, these two chambers communicating with one another through the above-said restricted passage, means for limiting to a small amplitude, that is to say less than 1 mm, the deformations of the partition in the axial direction perpendicular to its middle plane, and a liquid mass filling the two chambers as well as the restricted passage.

With such a support, a vibration of high frequency and of low amplitude exerted between the two rigid elements generates corresponding relative movements of the two rigid parts, which are transmitted to the deformable partition by the liquid contained in the operating chamber, and are manifested by a rapid succession of alternate deformations of this partition perpendicular to itself, of amplitude lower than the maximum possible value: the dimensions of the partition are selected to be sufficient, so that the latter can thus absorb the signaled movements without the liquid being driven through the restricted passage in opposite directions in synchronism with the vibration.

On the other hand, for oscillations of higher amplitude and of lower frequency, the amplitude of the corresponding deformations of the partition reaches its maximum possible value and the liquid is then driven through the restricted passage, which ensures the hydraulic damping of this liquid through its throttling in this passage.

With current modes of construction of supports of the type concerned, the mass supported (engine or the like) is only connected to the bearing structure (frame of the vehicle) by the first elastic walls of the supports.

It can therefore happen that certain abnormally high stresses exerted on the supported mass, such as those due to sudden decelerations or accelerations, are manifested by excessive deformations of these walls which can result in their tearing away or their rupture and generate shocks producing damage between said supported mass and its immediate environment.

GENERAL DESCRIPTION OF THE INVENTION

It is a particular object of the invention to overcome this drawback by limiting by a stop the deformations concerned.

For this purpose, the supports of the type concerned according to the invention are essentially characterised in that they comprise:
  a rigid ring borne by the annular armature between the deformable partition and the first elastic wall, of which ring the inner edge dips into the operating chamber,
  and a foot extending the first rigid part inwards of the operating chamber, said foot traversing with clearance the rigid ring and being terminated beyond this ring by an overlapping sole, whose perpendicular cross section is greater than the passage cross-section of the ring.

In preferred embodiments, recourse is had in addition to one and/or other of the following features:
  the surfaces, of the foot and/or of the sole, which can come into abutment against opposite bearing surfaces of the rigid ring, or of other components of the support, are covered by a cushion of rubber or similar material,
  the foot is constituted by a cylindrical pin and the sole by a small plate attached axially to the free end of this pin,
  the rigid ring comprises an inner flat washer positioned inside the first elastic wall and joined, by an annular portion, incurved in an S, to an outer flat washer, axially offset with respect to the inner washer, and axially gripped between the first elastic wall and the peripheral portion of the seat of the deformable partition.

The invention comprises, apart from these main features, certain other features which are preferably used at the same time, and which will be more explicitly considered below.

BRIEF DESCRIPTION OF THE DRAWINGS

In the following, preferred embodiments of the invention will be described with reference to the accompanying drawings given, of course, purely by way of non-limiting illustration.

In the drawings.

DESCRIPTION OF PREFERRED EMBODIMENTS

Figure 1:
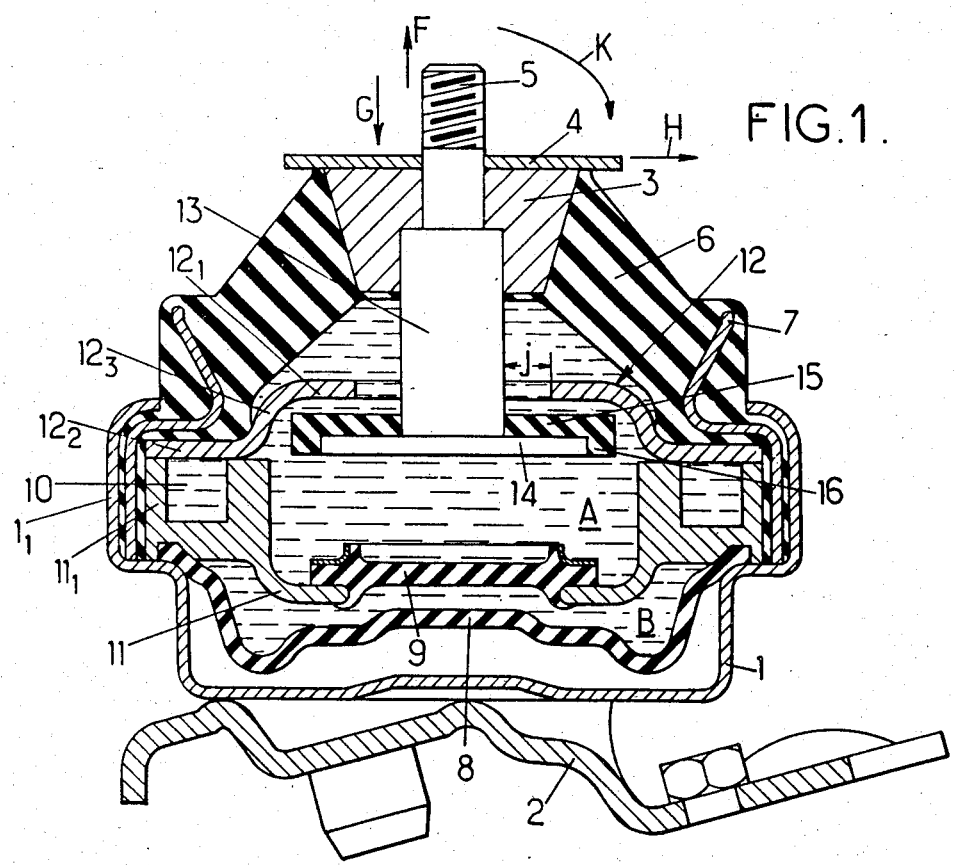
FIG. 1 shows in axial cross section, an embodiment of an antivibration support constructed according to the invention.

The said support is designed to be interposed vertically between a rigid carrier member constituted by a vehicle frame, and a rigid supported member constituted by an internal combustion engine.

The terms "top, bottom, upper and lower" used in the description which follows, are by way of non-limiting example, since the support described can perfectly well be used in the reverse direction to that adopted for this description.

The support concerned is in the general shape of a fluid-tight housing or box comprising:

- a rigid lower cup 1, whose incurved edge $1_1$ constitutes a bush or annular armature enabling the whole to be assembled by crimping, as will be explained below, said cup being made fast, particularly by welding, with a lug 2 easy to mount on the frame of the vehicle.
- a rigid cap comprising a solid frustoconic body 3 flared upwardly, itself capped by a disc 4 and extended by a threaded bolt 5 in stand-by position,
- a thick and fluid-tight frustoconic wall 6 of rubber or similar elastic material, having good resistance to axial compression and to transverse flexion, and bonded respectively to the body 3 and to an annular reinforcement 7 of Z shape, said reinforcement itself being connected in fluid-tight manner to the bush $1_1$,
- and a fluid-tight elastic wall 8, whose periphery is also attached in fluid-tight manner to the bush $1_1$, the said wall being preferably constituted by a thin flexible diaphragm folded in concentric rings.

A deformable partition 9 divides the inside of the box into two chambers, namely an upper "operating" chamber A, on the side of the wall 6, and a lower "compensating" chamber B on the side of the wall 8.

These two chambers A and B are filled with liquid and communication between them is ensured permanently through a restricted passage 10.

In the embodiment illustrated, the wall 9 is constituted by a flexible diaphragm, whose edge is fixed to a rigid annular seat 11, itself extended externally by an annular rim $11_1$.

The passage 10 is here constituted by a curvilinear channel, hollowed in the rim $11_1$, said channel extending along a circular arc comprised between 180° and 300° and connected at its two ends with respectively the two chambers A and B.

Means known in themselves are in addition provided to limit the deformations of the diaphragm 9 to a small amplitude, namely less than 1 mm.

There is also provided, according to the invention, stop means enabling the deformations of the frustoconic wall 6 to be limited in any direction, and to prevent thus on the one hand, the deteriorations, even ruptures, of this wall 6, and on the other hand, disturbing shocks between the supported engine and the walls of the housing of this engine.

These stop means comprise:

- on the one hand, a rigid ring 12, whose inner edge is extended into the operating chamber, A,
- and on the other hand, a foot 13 axially extending the body 3 downwards, said foot traversing with a radial clearance j the ring 12 and terminated beyond this ring by a transversely overlapping sole 14.

The foot 13 is advantageously constituted by a cylindrical pin housed in a complementary recess of the body 3, and forming a single part with the bolt 5, which extends this pin upwards.

The overlapping sole 14 is advantageously in the form of a small plate which can be integral with the pin 13, or be axially attached against the end of this pin.

The cross-section of the sole 14 is distinctly greater than that of the free passage cut out of the ring 12.

The upper surface of the overlapping margin of the sole 14, that is to say, its surface turned towards the ring 12, is covered with an annular cushion 15 of rubber or similar elastic material.

Figure 2:
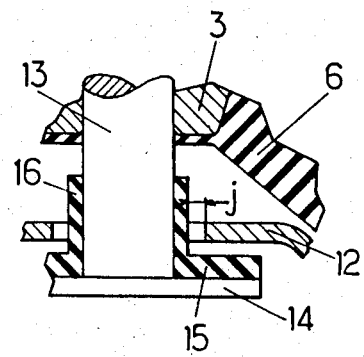
FIG. 2 shows similarly a modification of a portion of this support, also according to the invention.

A sleeve 16, also constituted of rubber or the like, is provided on the peripheral surface, of the foot 13 or of the sole 14, which can come radially into abutment against an opposite bearing surface: this is the case of the sole 14 in FIG. 1, and the base of the foot 13 joined to the sole in FIG. 2.

The radial clearance j between the foot 13 and the ring 12 must be sufficient for the passage of the damping liquid at this level not to be restricted to the point of disturbing the functioning of the shock-absorber.

This clearance j must, on the other hand, be sufficiently small for the ring 12 to be able to perform its abutment role effectively, specified below, in all directions.

In the preferred embodiment illustrated, the ring 12 is constituted, not by a single flat washer, but by an inner flat washer $12_1$ joined to an outer flat washer $12_2$ axially offset with respect to the inner washer, through an annular connecting portion $12_3$, having an S profile. This inverted cup-shaped construction permits at the same time:

- the placing inside the frustoconic wall 6 of the inner flat washer $12_1$, which consitutes the active part of the ring 12 operating as a stop,
- and the mounting of the ring 12 inside the support by simple axial clamping of its outer flat washer $12_2$ between the rim $11_1$ of the seat 11, and the wall 6, or rather, the annular reinforcement 7 of this wall 6.

It is the axial clamping of these three parts ($11_1$, $12_2$, and 7), as well of the periphery of the elastic wall 8, which is ensured by external crimping of the bush 1.

The role of the mutual abutment between the ring 12 and the foot 13, extended by the sole 14, is played in the following manner.

In the case of an abnormally high thrust of the engine upwards (along the arrow F), the wall 6 is distorted in traction up to the axial abutment of the overlapping portion of the sole 14 against the edge of the ring 12.

This abutment is established first gradually due to the interposition of the cushion 15, then it totally interrupts the deformation in traction of the wall 6 when said cushion 15 is fully squeezed.

In the opposite case of a strong thrust of the engine downwards (along the arrow G), the wall 6 commences by being deformed by compression and flexion, being gradually squeezed against the ring 12, up to the final axial abutment of the body 3 itself against said ring.

Finally, in the case of a horizontal lateral thrust (along the arrow H), or a tilting thrust (along the arrow K), it is the peripheral section of the sole 14 or the lateral wall of the base of the foot 13 which comes into abutment against the transverse opposite bearing surface of the support with again a first elastic squeezing phase:

in the case of FIG. 1, for which the clearance j is relatively large, the abutment is established between the section of the sole 14 and the incurved zone $12_3$ of the ring 12, in the case of FIG. 2, which shows a smaller clearance j, the abutment is produced between the base of the foot 13 and the inner section of the inner washer $12_1$.

Thus, in all cases where an abnormally high thrust is exerted on the supported engine, for example, in the case of sudden deceleration of the vehicle, there is observed an interuption, first gradual and finally extremely firm and certain of the deformations of the wall 6.

As a result of which, and whatever the embodiment adopted, there is finally provided a support whose constitution and operation results sufficiently from the foregoing.

This support offers over those known hitherto the important advantage of ensuring a very solid anchorage of the first rigid part of the second, that is to say, in the application mentioned by way of example, of the engine on the frame of the vehicle, in view of the limitation by elastic abutment which is imposed, in such a support, on the deformations of the wall 6, during the exertion of abnormally high thrusts on the supported mass.

As is self-evident, and as emerges besides already from the foregoing, the invention is in no way limited to those of its types of application and embodiments which have been more especially envisaged; it encompasses, on the contrary, all modifications, particularly:

those where the overlapping sole 14 and its covering 15 would be pierced by holes or notches, passing axially through them from one side to the other, so as to facilitate the free flow of the liquid between this sole and the ring 12, those where cushions of rubber or other elastic material intended to dampen the shocks between the central stop, (foot and/or sole) and the opposite bearing surfaces, would be provided on these bearing surfaces, instead of being provided on this stop, or in addition to those provided on this stop, those where said cushions, whilst remaining elements of revolutions around the axis of the support, would have a variable and non-constant thickness over their whole extent, those where the profile of the central stop (foot and/or sole) and/or that of the opposite bearing surfaces, would be determined so as to obtain the desired progression of the various elastic abutments observed on the exertion of abnormally high thrusts on the supported mass, the opposite surfaces on the ring 12 and of the central stop 13,14, posssibly being in particular no longer flat, but frustoconic, with angles of conicity which may or may not be identical, the half angle at the apex of each cone concerned, of axis merging with that of the support, being particularly of the order of 60° to 80°: in the latter case, the shape of the inner washer $12_1$ is frustoconic and approaches that of the inner surface of the frustoconic wall 6.

We claim:

1. Antivibration device designed to be inserted for purposes of support and damping between two rigid elements, constituted by a fluid-tight box, interposed between the two rigid elements, said box comprising two rigid parts which can be made fast respectively with the two rigid elements, a first elastic wall connecting in fluid-tight manner one of the two rigid parts, to an annular armature, forming a portion of the other part, and ensuring the role of support between the two parts, a thin flexible wall borne in fluid-tight manner by the annular armature, a deformable partition also borne in fluid-tight manner by the annular armature, between the two said walls, and dividing the inside of the box into two chambers, namely an operating chamber comprised between the deformable partition and the first elastic wall and a compensating chamber comprised between the deformable partition and said thin flexible wall, said two chambers communicating with one another through a restricted passage, means for limiting to a small amplitude, that is to say less than 1 mm, the deformations of the partition in the axial direction perpendicular to its middle plane, and a liquid mass filling the two chambers, as well as the restricted passage, said device comprising a rigid ring borne by the annular armature, between the deformable partition and the first elastic wall, of which ring the inner edge dips into the operating chamber, and a foot extending from the first rigid part inwards of the operating chamber, said foot traversing with clearance, through a passage in the rigid ring and being terminated beyond said ring by an overlapping sole whose perpendicular cross-section relative to the foot is greater than the passage cross-section of the ring, thereby limiting deformation of the first elastic wall.

2. Device according to claim 1, wherein the surfaces, of one of the foot and the sole, which can come into abutment against opposite bearing surfaces of the rigid ring and other components of the support, are covered with a cushion of elastomeric material.

3. Device according to claim 1, wherein the foot is constituted by a cylindrical pin and the sole by a small plate attached axially to the free end of this pin.

4. Device according to claim 1, wherein the rigid ring comprises an inner flat washer positioned inside the first elastic wall and joined by an annular portion of incurved S shape to an outer falt washer, axially offset with respect to the inner washer and gripped axially between the first elastic wall and the peripheral portion of the seat of the deformable partition.

5. Device according to claim 1, wherein the opposite surfaces of the rigid ring and of the foot-sole assembly are frustoconic.

6. Device according to claim 5, wherein the angles of conicity of the opposite surfaces are identical, the half angle at the apex of the cone concerned being of the order of 60° to 80°.

* * * * *